(12) United States Patent
Stretton et al.

(10) Patent No.: US 7,886,520 B2
(45) Date of Patent: Feb. 15, 2011

(54) GAS TURBINE ENGINE

(75) Inventors: Richard G Stretton, Loughborough (GB); Pawel R Zakrzewski, Derby (GB)

(73) Assignee: Rolls-Royce plc, London (GB)

( * ) Notice: Subject to any disclaimer, the term of this patent is extended or adjusted under 35 U.S.C. 154(b) by 729 days.

(21) Appl. No.: 11/785,646

(22) Filed: Apr. 19, 2007

(65) Prior Publication Data

US 2007/0245739 A1   Oct. 25, 2007

(30) Foreign Application Priority Data

Apr. 20, 2006   (GB)   .................................. 0607773.9

(51) Int. Cl.
*F02K 99/00* (2009.01)
*F02K 3/02* (2006.01)

(52) U.S. Cl. .......................... 60/266; 60/226.1; 60/267; 60/782; 60/785; 60/806; 60/770; 239/265.17; 239/265.19

(58) Field of Classification Search ................ 60/226.1, 60/266, 267, 782, 785, 806, 770; 239/265.17, 239/265.19
See application file for complete search history.

(56) References Cited

U.S. PATENT DOCUMENTS

| | | | | |
|---|---|---|---|---|
| 4,254,618 | A | * | 3/1981 | Elovic ........................ 60/226.1 |
| 4,791,782 | A | | 12/1988 | Seed |
| 5,203,163 | A | | 4/1993 | Parsons |
| 5,438,823 | A | * | 8/1995 | Loxley et al. ............... 60/39.08 |
| 5,729,969 | A | | 3/1998 | Porte |
| 6,751,944 | B2 | * | 6/2004 | Lair ........................... 60/226.3 |
| 2008/0230651 | A1 | * | 9/2008 | Porte ........................ 244/118.5 |

FOREIGN PATENT DOCUMENTS

| | | | |
|---|---|---|---|
| EP | 0 608 142 | A | 7/1994 |
| EP | 0 924 407 | A | 5/2001 |
| GB | 2 043 178 | A | 10/1980 |
| GB | 2 224 080 | A | 4/1990 |
| GB | 2 302 371 | A | 1/1997 |

* cited by examiner

*Primary Examiner*—Michael Cuff
*Assistant Examiner*—Young Choi
(74) *Attorney, Agent, or Firm*—Jeffrey S. Melcher; Manelli Denison & Selter PLLC (57) ABSTRACT

Within a turbine engine a heat exchanger may be provided to cool compressor air flows to be utilized for cabin ventilation or other functions. A fluid flow acting as a coolant for the heat exchanger is generally drawn from the by-pass duct of the engine and a dedicated outlet duct is provided such that the exhausted fluid flow from the heat exchanger is delivered along the conduit duct to a low pressure region. In such circumstances, an appropriate pressure differential across the heat exchanger is maintained for operational efficiency when required, whilst the exhausted fluid flow is isolated and does not compromise the usual engine ventilation vent exit area sizing. Over-sized ventilation vents would create an aerodynamic step and therefore drag upon the thrust of the engine. Typically, the outlet end of the outlet duct has a variable geometry to enable adjustment in the pressure differential across the heat exchanger such that an air fan valve used to control flow rate through the heat exchanger may not be required.

12 Claims, 8 Drawing Sheets

GAS TURBINE ENGINE

CROSS-REFERENCE TO RELATED APPLICATIONS

This application claims priority to GB 0607773.9, filed 20 Apr. 2006 now granted United Kingdom patent GB 2,438, 696.

BACKGROUND OF THE INVENTION

The present invention relates to gas turbine engines (gas or steam) and more particularly to heat exchanger arrangements within such turbine engines utilised to provide ventilation air or for cooling of other fluids such as fuel or oil or compressed air utilised for de-icing.

Figure 1A:
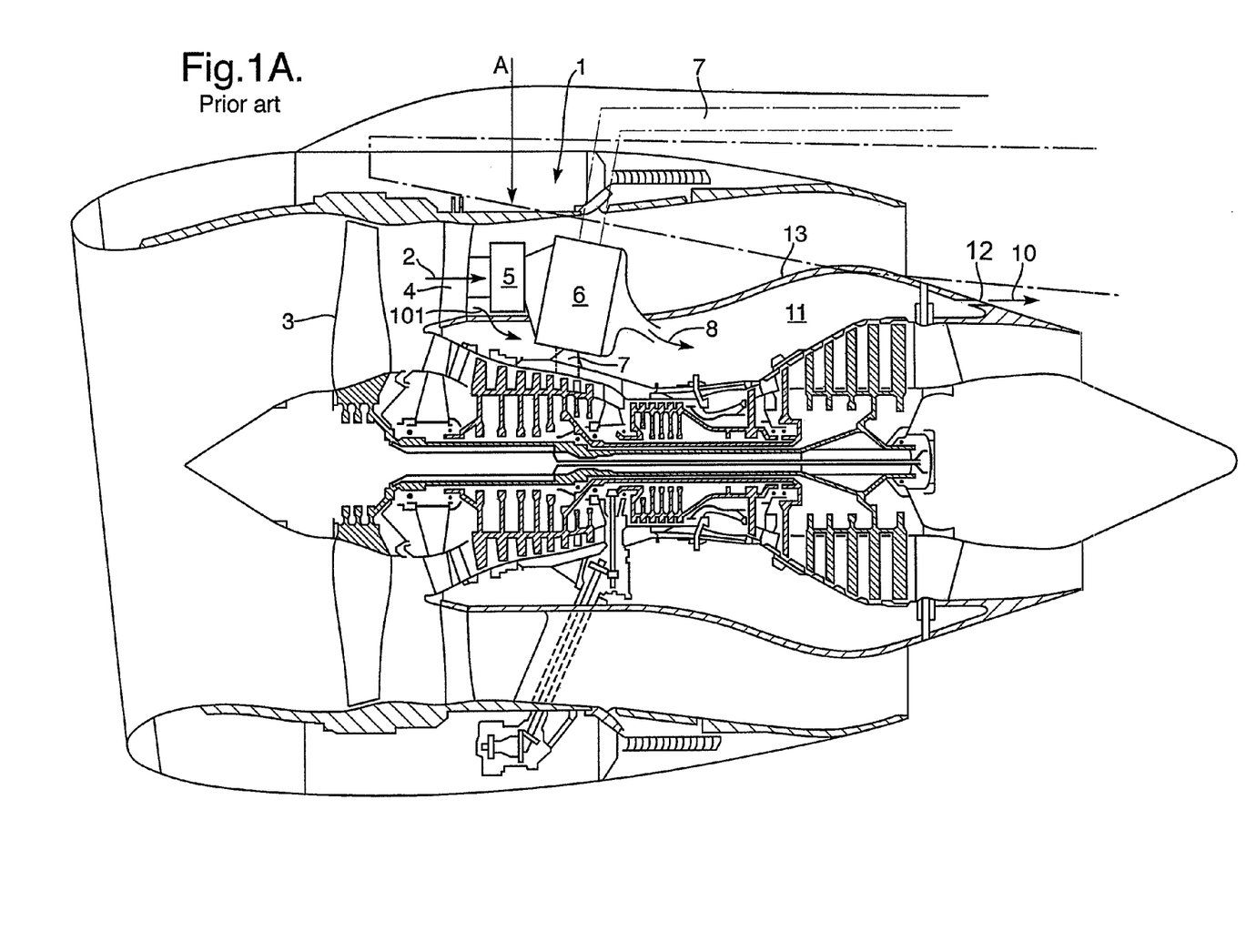
FIG. 1a is a schematic side view of an engine showing a prior art heat exchanger arrangement.
Figure 1B:
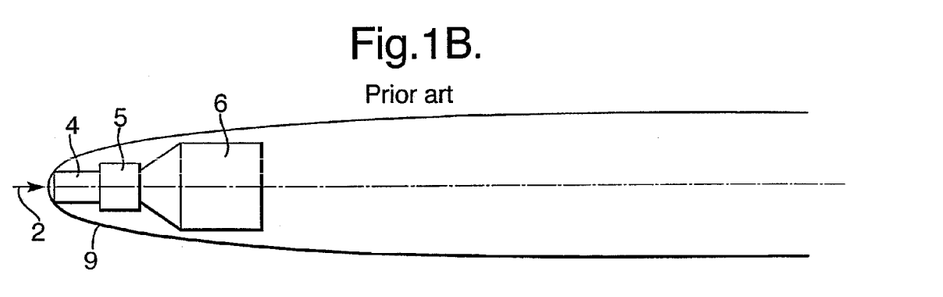

FIG. 1a is a schematic side view of an engine showing a prior art heat exchanger arrangement and FIG. 1b is a plan view in the direction of arrowhead A of the engine and in particular the heat exchanger arrangement as depicted in FIG. 1a; Compressed air bled from the compressor stages of a gas turbine engine is utilised to provide ventilation air within the cabin of an aircraft associated with a gas turbine engine. This air must be cooled for acceptability with respect to such ventilation or other functions. Typically, the heat exchanger acts as a pre-cooler taking fan by-pass air flow to act as a fluid flow for coolant through the heat exchanger. This fluid flow after acting as a coolant within the heat exchanger in some turbine engine configurations is exhausted into an engine compartment or zone. Previously, as illustrated in prior art FIGS. 1a and 1b, the heat exchanger arrangement 1 comprises a heat exchanger 6 which is presented with a fluid flow 2 from a Fan compressor stage 3 and a guide vane 4. The heat exchanger 1 is housed within a bifurcation 9. The fluid flow 2 passes through an air fan valve 5 to regulate the flow rate into the heat exchanger 6 where as indicated a cooling action occurs with respect to a bled compressor air flow taken through ducting 7 shown in broken line. The exhaust fluid flow 8 exits into a vent zone 11 where it is mixed with gas flows, including ventilation air flow 101, through the engine. Such an approach has a number of problems including increase in the temperature in the zone 11 and as a result of the large exit area results in a drag effect within the zone 11 detrimental to operation.

In view of the above, although exhausting fluid flow 8 into the zone 11 is mechanically simple it creates a number of problems. The zone vent exit 12 has to be sized to deal with the combined usual zone ventilation flow 101 through a central cowling 13 of the engine as well as the highest potential exhaust flow 8, and flight conditions when the heat exchanger 6 is not operating. Furthermore, thrust recovery is compromised from the vent zone 11 in view of the size of the vent 12 which is effectively over-sized through normal operation for the reasons described above. It will also be understood that this over-sized vent 12 creates a drag penalty because the vent acts as an aerodynamic step or discontinuity when the exhaust flow 8 is not flowing. A further disadvantage as indicated above is that there is extra heat input to the zone 11 which may require considerable shielding and heat resistant cabling within the core 13. It will also be understood the variability with regard to the exhaust flow 8 makes tuning of the flow regimes in the event of a fire extremely difficult in order to maintain that the extinguishants achieve a required density in all parts of the zone 11.

SUMMARY OF THE INVENTION

In accordance with aspects of the present invention there is provided a turbine engine comprising a heat exchanger to receive a fluid flow and the heat exchanger having an exhaust outlet for the fluid flow after it has passed through the heat exchanger, the turbine engine having a by-pass duct leading to a low pressure region, the engine characterised in that the exhaust outlet comprises an independent outlet duct to act as a conduit for the fluid flow from the heat exchanger to the low pressure region.

Preferably, the low pressure region is outside of the by-pass duct and the outlet duct extends to an aperture in a central core cowl of the engine.

The engine is surrounded by a nacelle and attached to an aircraft via a pylon and alternatively the low pressure region is an external airwashed surface of the pylon, nacelle or associated fairings thereof.

The engine usually comprises a ventilation zone defined between a core cowl and an outer cowling, the ventilation zone having a ventilation fluid flow therethrough and an outlet, which is sized for the ventilation flow alone.

Advantageously, the outlet duct has a variable geometry nozzle. Typically the variable geometry nozzle is at a downstream aperture of the outlet duct.

Typically, the outlet duct has a converging nozzle to facilitate static pressure reduction in a fluid flow.

Typically, the outlet duct has more than one outlet aperture or slot for the fluid flow.

Potentially, the outlet duct has a baffle to facilitate static pressure reduction in the fluid flow.

BRIEF DESCRIPTION OF THE DRAWINGS

Embodiments of the present invention will now be described by way of example only with reference to the accompany drawings in which:

FIG. 1b is a plan view in the direction of arrowhead A of the engine and in particular the prior art heat exchanger arrangement depicted in FIG. 1a;

FIG. 2b is a plan view in the direction of arrowhead A of the engine and in particular the heat exchanger arrangement and outlet ducting as depicted in FIG. 2a;

DETAILED DESCRIPTION OF THE INVENTION

As indicated above, heat exchangers in accordance with aspects of the present invention are utilised within a gas turbine engine in order to provide cooling for compressed air flows utilised for cabin ventilation or other functions. In such circumstances it is important that an adequate pressure drop across the heat exchanger is maintained such that a fluid flow presented as a coolant to the heat exchanger will pass through the heat exchanger in order to cool the compressed air flows appropriately. Exhausting of that fluid flow passed through the heat exchanger creates the problems outlined above but nevertheless maintenance of an adequate pressure differential is essential.

In accordance with aspects of the present invention a dedicated, independent outlet ducting for the exhaust fluid flow from the heat exchanger is provided. This dedicated outlet ducting acts as a conduit for the exhaust fluid flow from the heat exchanger to a location where there is ambient or low static pressure. This low pressure area will tend to be downstream of a by-pass duct for the engine or within a mounting such as the pylon mounting for the engine upon an aircraft wing. The additional dedicated ducting in accordance with aspects of the present invention may add to weight and also assembly problems but nevertheless will allow maintenance of the necessary pressure differential in the heat exchanger for adequate operation without causing significant problems with respect to drag and other factors as described above.

Figure 2A:
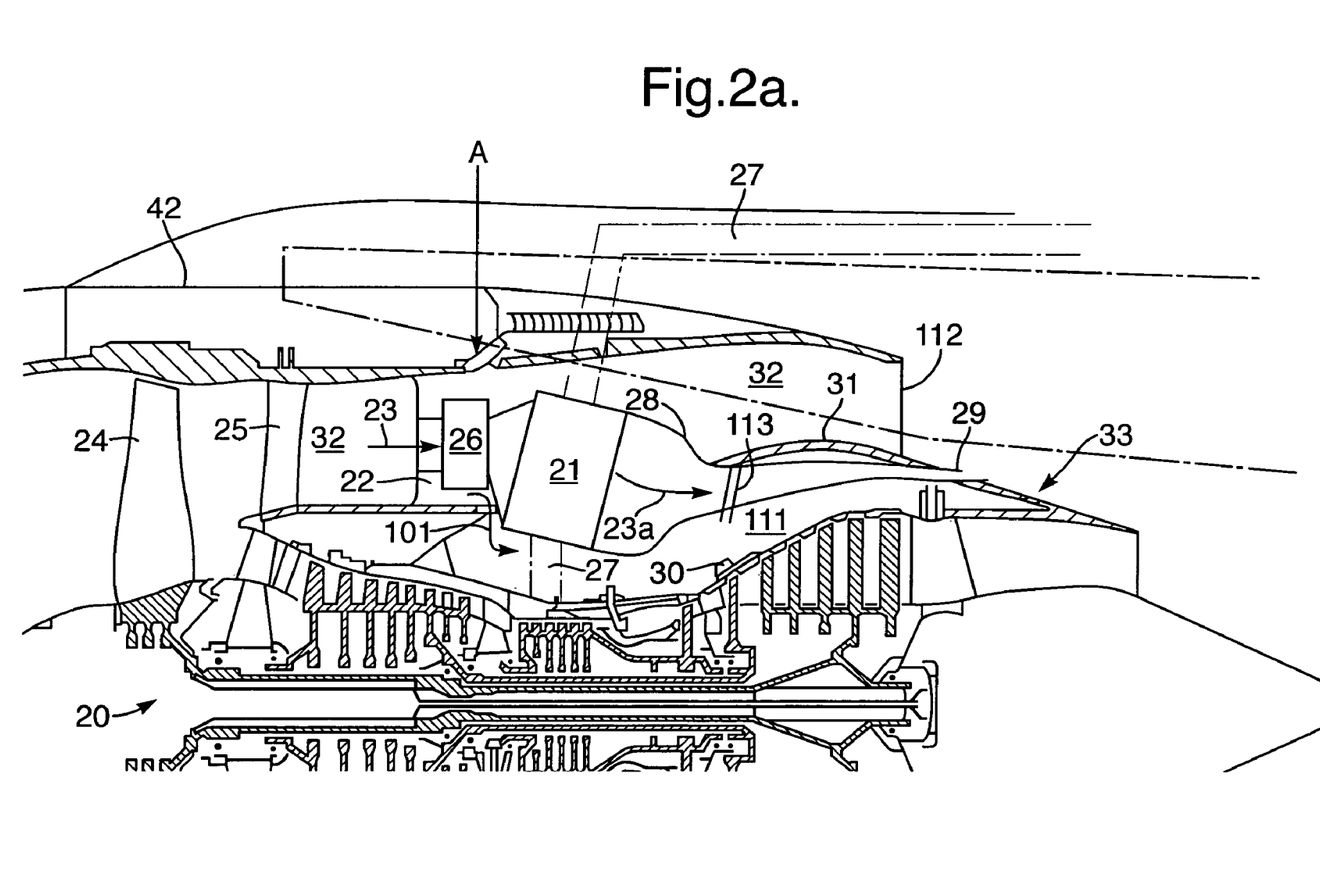
FIG. 2a is a schematic side view of an alternative outlet arrangement with an independent heat exchanger outlet on the aft core cowl
Figure 2B:
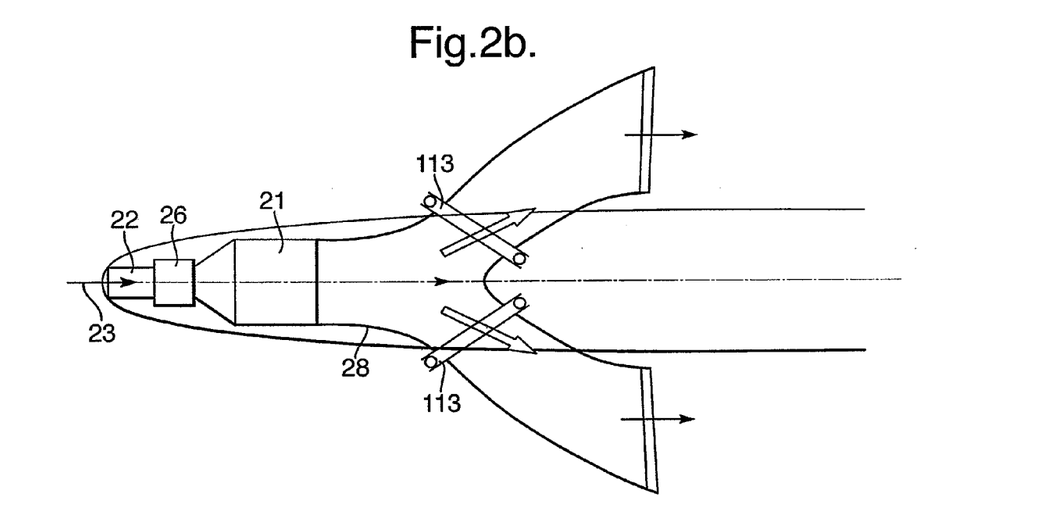

FIGS. 2a and 2b illustrate a first embodiment of an engine 20 in accordance with aspects of the present invention. A nacelle 42 of conventional style surrounds the engine 20. The engine 20 has a heat exchanger 21 located within a housing 22 in order to receive a fluid flow 23 to act as a coolant within the heat exchanger 21. The fluid flow 23 originates from a compressor 24 and will typically be guided by vanes 25.

Operation of the heat exchanger 21 as indicated involves the fluid flow 23 passing through an inlet having a fan air valve 26 to regulate fluid flow. The fluid flow then passes into the heat exchanger 21 where compressed air passed through a conduit 27 (shown in broken line) is cooled for cabin ventilation or other functions as described previously. Exhausted fluid flow 23a then passes through an outlet conduit or duct 28 to an outlet end 29 where it is released.

In accordance with aspects of the present invention this outlet 29 is in a low pressure area of the engine 20. As can be seen a ventilation zone 111 is formed by concentric walls 30, 31 respectively of a core cowl and an outer cowling. The outer cowling 31 and the nacelle 42 define a bypass duct 32, through which the propulsive fan 24 air flows. In accordance with aspects of the present invention in the embodiment depicted in FIGS. 2a and 2b the outlet end 29 is located downstream of and outside an exit plane 112 of duct 32 where as indicated there is a relatively low pressure region. As this is a low pressure region it will be understood that an adequate pressure differential across the heat exchanger between the inlet side, that is to say where the air fan valve 26 is located, and an outlet exhaust side associated with the outlet duct 28 is maintained. It will also be understood that release of the exhaust fluid flow through the heat exchanger at the end 29 will not constrict or cause a problem with respect to a normal vent slot 33 at the aft of the core outer cowl 31. In order to maximise thrust recovery from the exhausted fluid flow through the heat exchanger 21 typically the outlet end 29 will have a variable geometry to optimise static pressure reduction and therefore control flow through the heat exchanger 21. Aspects of such variable geometry will be described below in relation to the following Figures.

FIG. 2b provides a plan view of the heat exchanger arrangement depicted in FIG. 2a. Thus, as can be seen, the outlet duct 28 is integral with the heat exchanger 21 acting as a cooler for compressor air flow in conduit 27 (FIG. 2a). The fluid flow 23 as indicated acts as a coolant within the heat exchanger 21 and is exhausted through the outlet duct 28. This outlet duct 28 may split as indicated into one or more paths to respective outlet ends 29 as apertures in the cowl 31 as described previously. It will also be understood that the outlet duct 28 will typically be integral with the engine structure or associated with nacelle parts for that engine.

As indicated, typically the outlet duct 28 will be arranged to terminate after appropriate branching at more than one outlet end and these will tend to be on both port and starboard sides of the engine.

In summary, the embodiment of the invention depicted in FIGS. 2a and 2b will be generally arranged to provide a conduit from the heat exchanger 21 whereby the fluid flow is ducted to vent overboard either through a single or double outlet end slot combination after the cowl 31. The outlet ducting 28 could be integral with a nacelle thrust reverser so that when the C ducts of the reverser are open the outlet duct 28 hinges open with the nacelle to give good access to the engine mounted hardware. Hence the duct 28 may comprise joints 113. Ideally, the outlet duct end 29 would have a variable cross-section to maximise thrust recovery and enable deletion of the existing upstream fan air valve 26 by regulating the reduction in static pressure the flow rate for the fluid flow 23 through the heat exchanger 21.

The variable cross-section geometry of the outlet duct end 29 could be achieved by actuation of discrete doors as discussed hereinafter.

Figure 3:
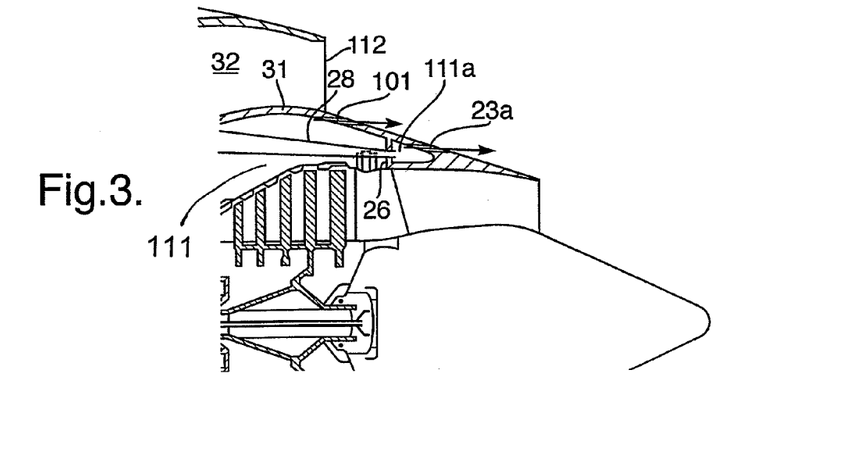
FIG. 3 is a side view of an alternative outlet nozzle for an outlet duct in accordance with aspects of the present invention.

FIG. 3 provides greater detail with regard to one end of the outlet duct 28 as described above with regard to FIGS. 2a and 2b. As can be seen, normal venting occurs from the core cowling 31 with a flow 101 separated by the outlet conduit 28 until downstream of the duct 32 exit plane 112.

The ventilation zone 111 extends to a baffle 26 in order to provide the exhaust fluid flow vent output 23a. This flow 23a is separately vented from the engine ventilation flow 101, in order to facilitate and optimise thrust recovery from both flows 23a and 101.

The baffle 26 acts to separate the flow 23a from the flow 101, creates a reduction in static pressure which facilitates, as indicated previously, a pressure differential across the heat exchanger 21. In such circumstances, a separate plenum area 111a for the flow 23 is created by the baffle 26. The flow 23 is essentially vented overboard through the aft core cowl 31 via an angular slot in a similar manner to the ventilation flow 101 within the cowl wall 31.

Thus In accordance with aspects of the present invention there is provided a heat exchanger having an independent exhaust outlet for its cooling fluid flow that is situated at a low pressure region. Typically, the low pressure region is outside of the engine by-pass duct 32, downstream of its exits plane 112. Preferably, the outlet duct extends to an aperture in a central core cowl 31 of the engine, but could be located on a suitable external air washed surface of the nacelle 42, pylon 89 or other engine or associated aircraft external fairing.

Figure 4:
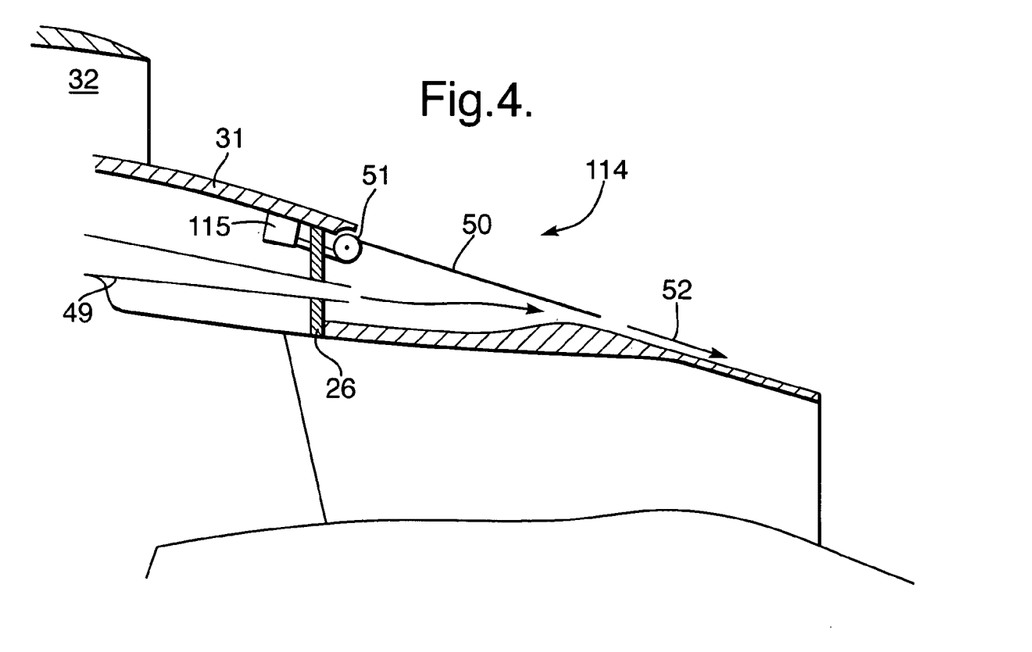
FIG. 4 is a schematic side view of an outlet duct end in accordance with aspects of the present invention in an open configuration.
Figure 5:
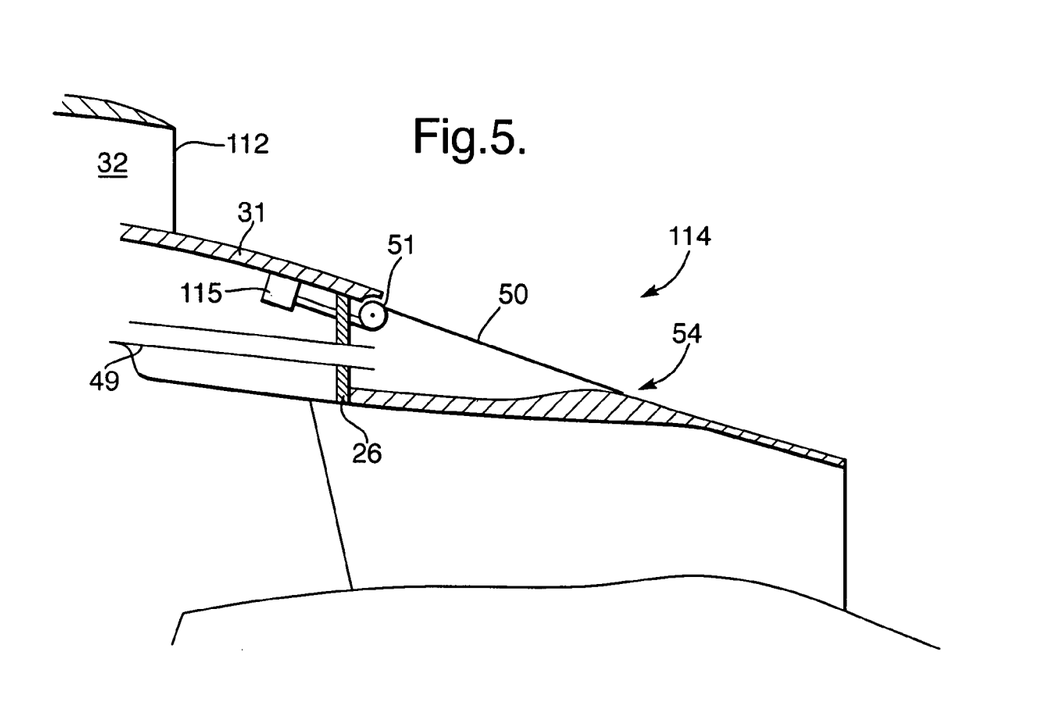
FIG. 5 is a schematic side view of the outlet duct end depicted in FIG. 4 in a closed configuration.

A further improvement of the present invention is to provide an outlet having a variable area to accommodate variable flows through the heat exchanger and that is capable of being sized for maximum thrust recovery. Therefore an alternative for the outlet duct end 29 is to provide a moveable door or flap displaceable as appropriate. FIGS. 4 and 5 schematically illustrate side views of such an outlet end respectively in an open configuration and in a closed configuration.

In FIG. 4 an outlet duct 49 as indicated previously is connected to a heat exchanger to present exhaust fluid flow after acting as a coolant within that heat exchanger. Exhausted fluid flow passes along the conduit 49 to an outlet end 114 incorporating a flap or door 50 having a hinge 51 at one end to enable displacement in order to allow release of a fluid flow 52 from the outlet duct 49. As indicated, the door or flap 50 is mounted upon the hinge 51 to the aft cowl 31 of an engine in accordance with aspects of the present invention. By displacement (rotation) of the flap 50, it will be understood that the outlet end and therefore the duct 49 can be variably opened dependent upon operational conditions and requirements. The cowl 31 area about the outlet end 114 will, as indicated above, be at a relatively low pressure and therefore the pressure differential across the heat exchanger varied appropriately.

In another embodiment, the outlet duct 49 may be replaced by an array of ducts 49 arranged one after the other circumferentially around the engine. A corresponding array of flaps or doors 50 is provided, such that there is a respective flap or door 50 for each duct 49.

In a further embodiment of FIG. 4, the outlet duct 49 is annular, and extends around the engine, and several doors or flaps 50 are provided adjacent to one another around the annular outlet duct 49. The series of interlocking flaps 50 may be driven between the open and closed position by an actuator 115 or combination of actuators using a unison or ring to control the movement of the doors.

The exit area variation could also be achieved by controlled deformation of a flexible sheet to avoid the steps and gaps associated with the interlocking doors.

In FIG. 5 the outlet duct end depicted in FIG. 4 is shown in a closed configuration. Thus, the door or flap 50 closes the duct 49 with a kiss seal 54, such that heat exchanger flow is stopped. The closed door or flap 50 results in minimum external flow disturbance and drag.

The door 50 may be arranged to have a faceted surface to accommodate a conical surface with regard to the cowl within which the duct 49 and therefore the outlet duct end 114 is accommodated.

Figure 6:
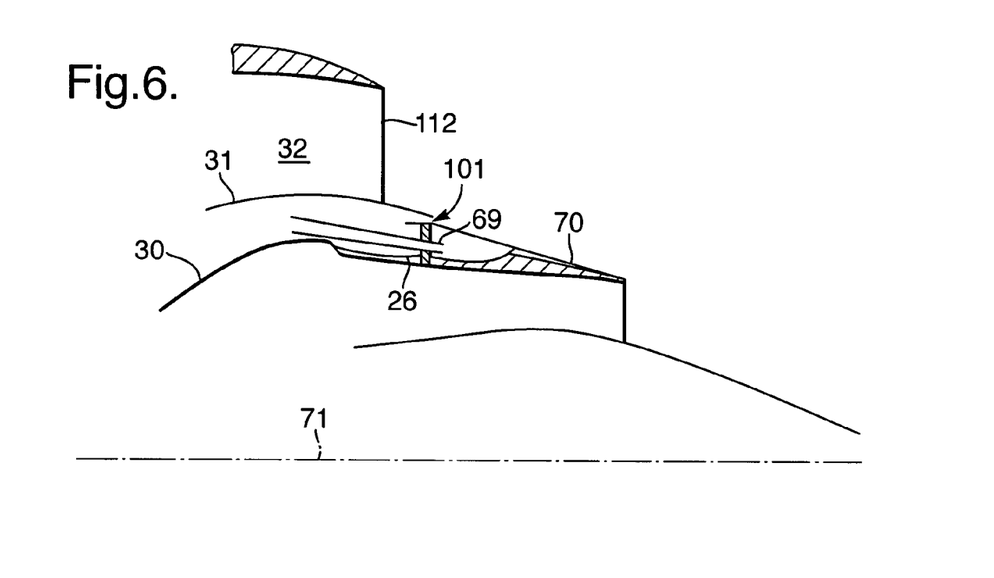
FIG. 6 is a schematic side view of a second outlet duct end in accordance with aspects of the present invention.
Figure 7:
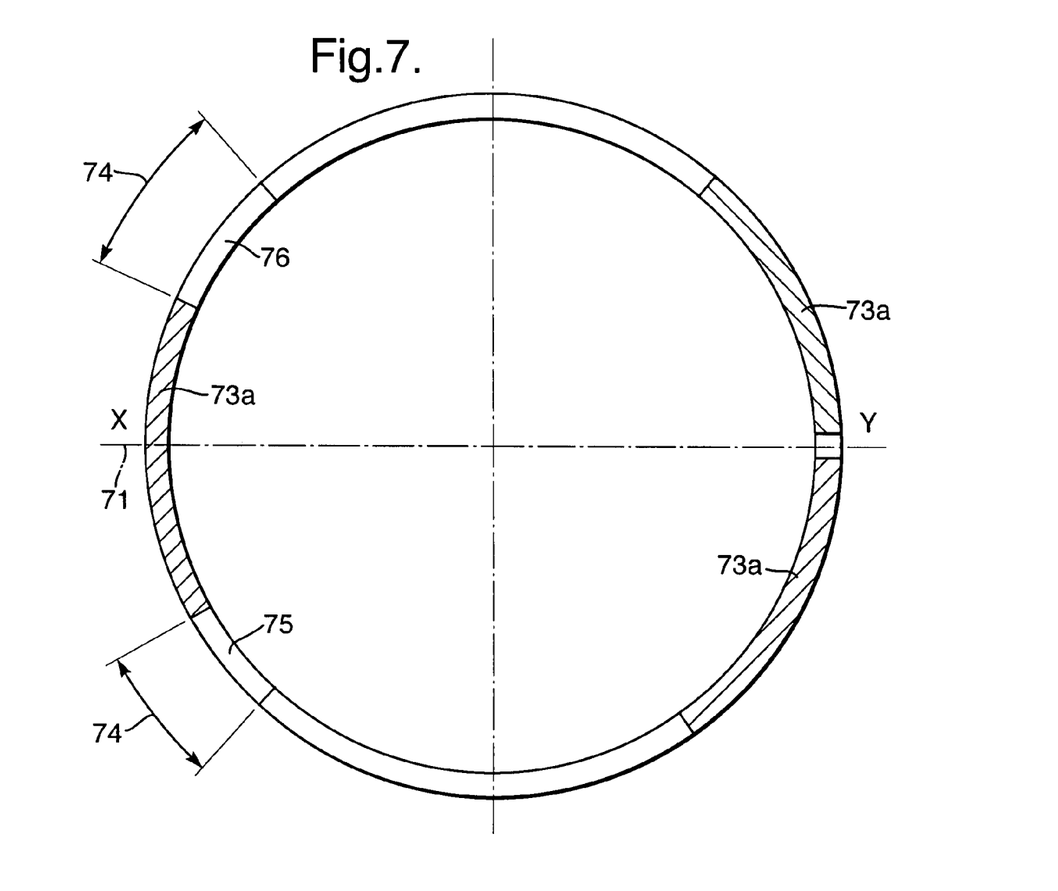
FIG. 7 is an end view of the outlet duct end depicted in FIG. 6 illustrating variation between an open configuration and a closed configuration through rotation of the outlet end.

An alternative to using hinged flaps or doors as described in FIGS. 4 and 5 is to provide a rotationally variable outlet end 114 for the outlet duct in accordance with aspects of the present invention. FIGS. 6 and 7 illustrate such an arrangement. In FIG. 6, a part side view of an outlet duct 69 in accordance with aspects of the present invention is depicted. This outlet duct 69 terminates in an outlet end having a rotary wedge element 70 arranged to vary the size of the available outlet aperture in the outlet end for the duct 69. Essentially, the arrangement comprises overlapping wedges in the cowl forming part of the outlet end and a rotatable ring about that cowl. The ring rotates about a centre line 71 for the engine such that variations in the degree of overlap adjusts the available aperture width and area. In short, variation in the overlap between the wedges will vary the degree of blockage and so dependent upon requirements a range of outlet aperture area sizes can be provided between a fully blocked and a situation of maximum overlap between the wedges.

FIG. 7 provides an end view upon respective side X and side Y illustrating with respect to side X a maximum overlap between the wedges to give minimum blockage and on side Y minimum overlap between the wedges giving maximum blockage and therefore no outlet aperture for exhausted fluid flow.

On side X as can be seen the blocked area 73a is a result of rotation in the direction of arrowheads 74 so that areas 75, 76 are available.

On side Y the wedges do not coincide and therefore there are no open apertures such as 75, 76 on side X and therefore no outlet aperture is available.

By the above approach it will again be appreciated that variation in the fluid flow through the heat exchanger can be adjusted for thrust recovery As indicated above, aspects of the present invention relate to provision of dedicated outlet ducts to a low pressure area or region about the engine. One such region is downstream of the by-pass duct for the engine. However, an alternative location for such low pressure regions is adjacent to the mountings such as the pylon structure by which an engine is secured to the wing in an aircraft. The outlet duct could be routed directly upwards through the pylon structure to vent overboard on the upper pylon fairing surface, or it is possible to route an outlet duct either inside of the pylon structure to vent overboard aft of the pylon fairing or in the pylon side walls. Outlets can be provided on a single side or both sides to minimise structural cut-outs in the primary pylon structure. Alternatively the pylon box structure could be used to duct the exhaust air to the outlet and eliminate the requirement for a duct inside the pylon. The outlet ends for the outlet duct would again preferably have a variable aperture size to maximise thrust recovery and to replace upstream fan air control valves as described previously with regard to the first embodiment in FIG. 2a.

Figure 8:
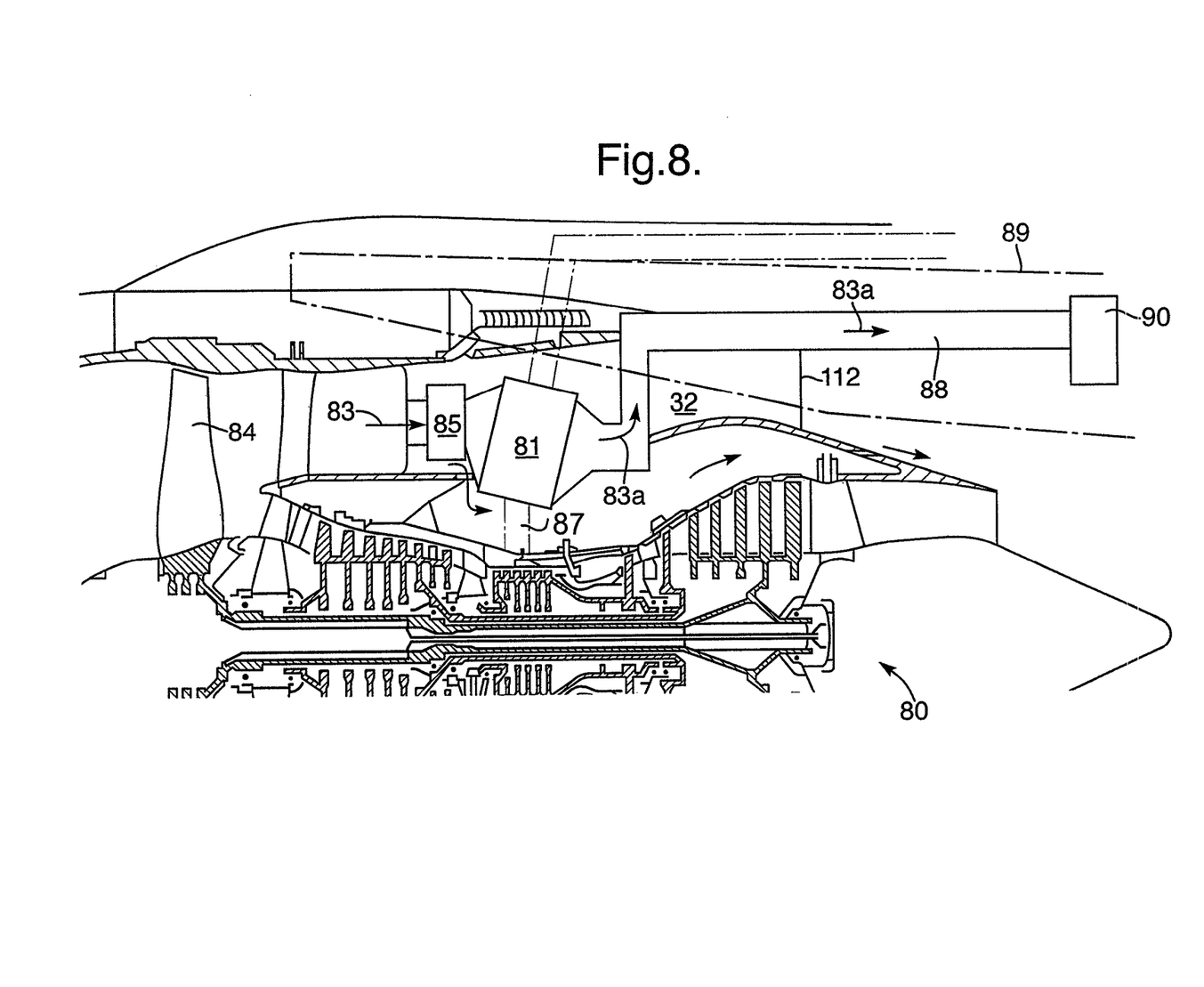
FIG. 8 is a schematic illustration of a further engine in accordance with aspects of the present invention.

FIG. 8 provides a side perspective view of another embodiment of an engine 80 in accordance with aspects of the present invention. As previously, the heat exchanger 81 receives a fluid flow 83 through a fan air valve 85 in order to provide cooling of a compressed air flow passing through ducting 87 shown in broken line. The fluid flow 83 is generated by a compressor 84 generally providing the fluid flow from the engine by-pass duct.

In accordance with the embodiment of the present invention as depicted in FIG. 8, exhausted fluid flow 83a is passed along outlet conduit 88 into a pylon structure 89 for release through an outlet 90 at a low pressure region about the engine 80. The outlet end 90 as indicated above will preferably have a variable outlet aperture to maximise thrust recovery and through variation in the static pressure flow rate for the fluid flow 83 through the heat exchanger 81.

The outlet duct 88 isolates the exhaust flow 83a and therefore avoids problems with respect to vent apertures and drag effects as described previously. A further alternative embodiment utilising a pylon mounting is depicted in schematic cross-section in FIG. 9. A gas turbine engine 100 incorporates a heat exchanger 91 which receives a fluid flow 93 as indicated previously generated by a compressor 94 and possibly presented through a fan air valve 95. Exhaust fluid flow 93a is again isolated from ventilation flows within a core cowl 31 and flows along a conduit provided by an outlet duct 98 extending into a pylon mounting 99.

Figure 9:
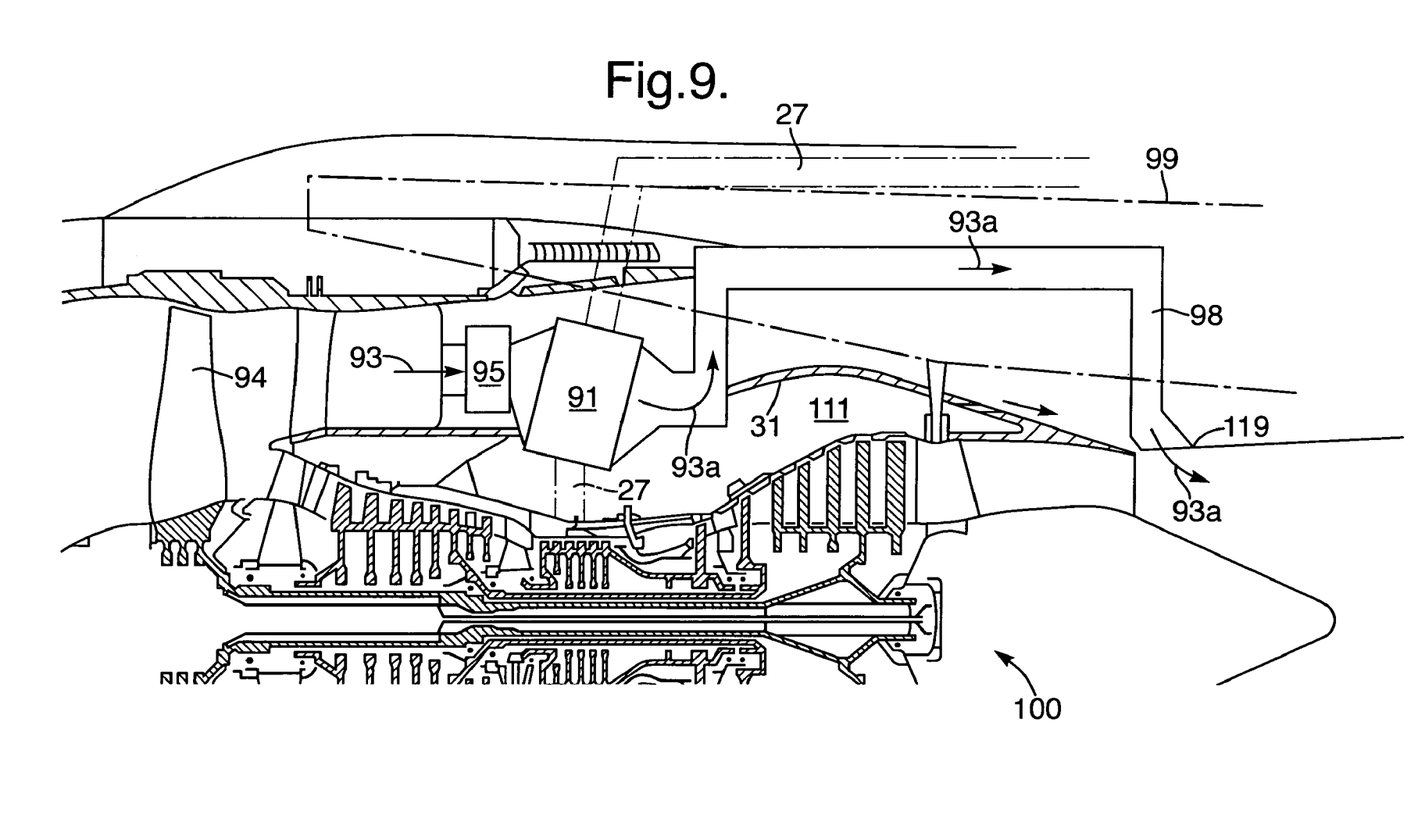
FIG. 9 is a schematic side view of a further outlet duct end utilised with respect to a pylon mounting.

In the alternative embodiment depicted in FIG. 9, the outlet conduit 98 extends as indicated through the pylon mounting 99 to a position downstream of the by-pass duct generally at the lower surface of the aft part of the pylon mounting 99. Such a position will use the exhaust flow 93a from the heat exchanger 91 to shield the aft pylon fairing lower surface from hot core flow exhausting from the engine 100.

An outlet end 119 for the outlet duct 98 will preferably have a variable geometry. As will be described later this can be achieved through a hinged door or flap or through louver slats possibly rotating in order to adjust the available aperture and therefore maximise thrust recovery and through flow control removing the requirement for the valve 95 upstream of the heat exchanger 91.

In both the embodiments depicted in FIGS. 8 and 9, it will be appreciated that the exhausted fluid flow from the heat exchanger is presented at a low pressure area about the respective engine. In such circumstances, a pressure differential across the heat exchanger can be maintained without the necessity of having an over-sized vent exit area creating problems with respect to drag.

Figure 10:
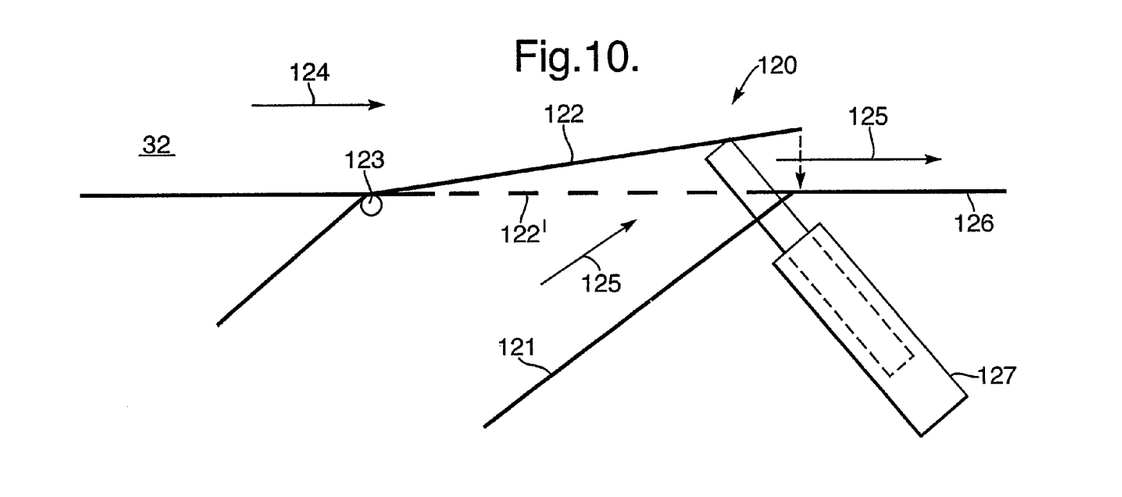
FIG. 10 is a side view of an alternative outlet end for a pylon mounting in accordance with aspects of the present invention.

As indicated above, providing a variable geometry outlet end for the outlet duct in accordance with aspects of the present invention is advantageous. FIG. 10, along with FIG. 11, show respective arrangements for creating variable geometry for an outlet end of an outlet duct in accordance with aspects of the present invention respectively.

In FIG. 10 a variable geometry outlet end 120 for an outlet duct 121 is achieved through a hinged flap or door 122. As indicated, the flap 122 is secured at an upstream end with a hinge 123 to allow pivot such that the flap or door 122 is displaceable to protrude into a fluid flow 124. In such circumstances as shown in FIG. 10, exhausted fluid flow 125 which passes along the outlet conduit or duct 121 coupled to the heat exchanger can be released through a gap between the door 122 and cowling part 126. As the flow 125 passes the door 122, a reduction in static pressure is created stimulating a flow 125 through the conduit 121 and therefore through the heat exchanger. The reduction in static pressure results in a greater pressure differential across the heat exchanger and therefore increased flow 125.

In a closed configuration depicted by dashed lines in FIG. 10, the door 122 extends completely across the outlet conduit 121 and an end 127 is in a kiss seal or other sealing relationship across the conduit 121 so that there is no exhausted fluid flow 125 as depicted in FIG. 10. In such circumstances, there will be no flow through the heat exchanger and thrust recovery from this component is not required.

Figure 11:
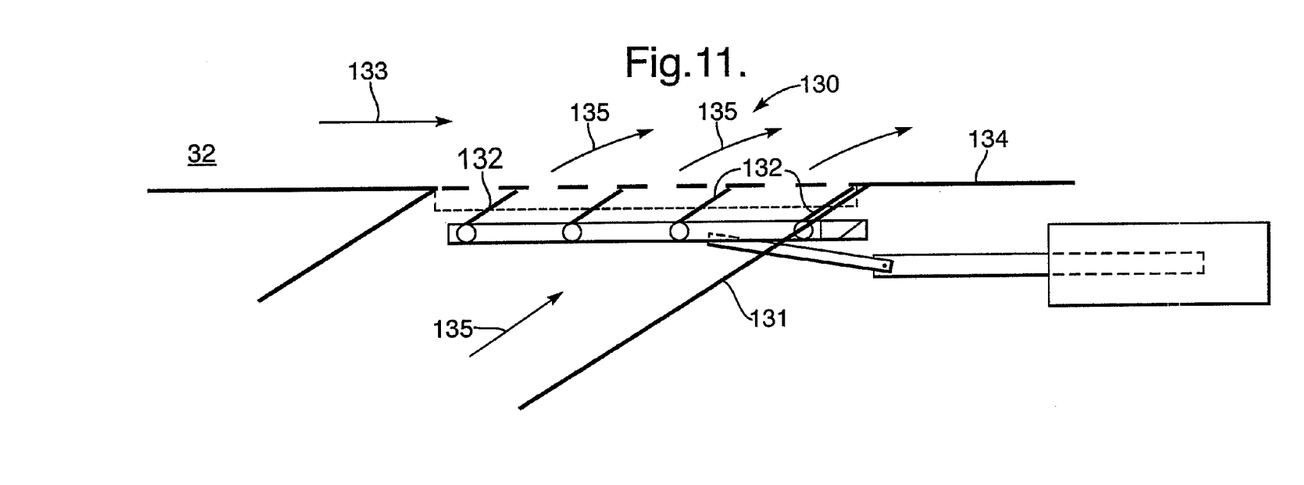
FIG. 11 is a side view of an alternative outlet end for a pylon mounting in accordance with aspects of the present invention.

FIG. 11 illustrates an alternative outlet end 130 for an outlet conduit 131 in an engine in accordance with aspects of the present engine. Variable geometry is achieved through rotatable louver slats 132 displaceable from an open configuration to a closed configuration depicted by the dashed lines. A free stream flow 133, creates low pressure on the pylon wall 134 as it passes over the outlet 130. In the open configuration an exhaust fluid flow 135 which has passed along the conduit 131 is released into the flow 133. As indicated, the flow 133 will constitute a relatively low pressure region facilitating pressure differential across the heat exchanger coupled to the outlet conduit 131. However, in view of the angular presentation of the flow 133, it will also be appreciated that a negative pressure will be created facilitating by entrainment in the flow 135 and will therefore enhance flow across the heat exchanger associated with the conduit 131.

In the closed configuration the louver slats 131 have rotated to a closed position such that there is no exhausted fluid flow along the conduit 131 and therefore no pressure differential across the heat exchanger. In such circumstances there will be no fluid flow across the heat exchanger and therefore drag or losses will be minimised when the heat exchanger is not required.

Aspects of the present invention relate to utilising a dedicated outlet duct integrally associated with the heat exchanger in order to present the exhaust fluid flow from that heat exchanger to a low pressure region. Such presentation at a low pressure region will maintain where required a pressure differential across the heat exchanger to facilitate operation. By provision of a variable geometry outlet to the outlet duct it is possible to alter the pressure differential across the heat exchanger and therefore when the heat exchanger is not required reduce the fluid flow bleed from other engine operations to recover thrust capacity. It will also be understood by presenting the dedicated outlet duct and outlet end locations away from high pressure regions the potential for drag is removed. The exhaust flow from the heat exchanger is isolated from typical vent requirements in the mounting arrangement of a gas turbine engine such that the vent size does not need to be over-specified due to the range of potential flow rates through the heat exchanger. In such circumstances a more appropriate vent size can be utilised minimising any aerodynamic step drag penalty.

We claim:

1. A gas turbine engine comprising:
a heat exchanger having an outlet duct for a coolant fluid flow passing therethrough during operation of the engine;
a by-pass duct having an exit plane; and
a ventilation zone defined between a core cowl and an outer cowling, said ventilation zone having a ventilation fluid flow therethrough during operation of the engine and a vent slot sized for said ventilation fluid flow alone, said heat exchanger outlet duct extending to an outlet end in said outer cowling downstream of said by-pass duct exit plane, said ventilation fluid flow and said coolant fluid flow being separate, wherein said heat exchanger outlet duct has a variable geometry nozzle to optimize static pressure reduction and therefore control fluid flow through said heat exchanger during operation of the engine.

2. A gas turbine engine as claimed in claim 1, wherein the variable geometry nozzle is at a downstream aperture of the outlet duct.

3. A gas turbine engine as claimed in claim 1, wherein the outlet duct has a converging nozzle to facilitate static pressure reduction in a fluid flow.

4. A gas turbine engine as claimed in claim 1, wherein the outlet duct has more than one outlet aperture or slot for the fluid flow.

5. A gas turbine engine as claimed in claim 1, wherein the ventilation zone extends to a baffle to provide a separate plenum chamber for said heat exchanger outlet duct outlet end for exhausting the heat exchanger flow.

6. A gas turbine engine as claimed in claim 1, wherein the outlet duct passes through the ventilation zone.

7. A gas turbine engine as claimed in claim 1, wherein the variable geometry nozzle comprises a moveable door or flap.

8. A gas turbine engine as claimed in claim 1, wherein the variable geometry nozzle comprises a series of interlocking flaps.

9. A gas turbine engine as claimed in claim 1, wherein the variable geometry nozzle comprises a flexible sheet, its deformation controlled to achieve exit area variation.

10. A gas turbine engine as claimed in claim 1, wherein the variable geometry nozzle comprises a rotationally variable outlet end.

11. A gas turbine engine as claimed in claim 10, wherein the rotationally variable outlet end comprises a rotary wedge element.

12. A method of operating the gas turbine engine according to claim 1, wherein the method comprises varying the nozzle geometry to control the fluid flow through the heat exchanger.

* * * * *